Figure 1:
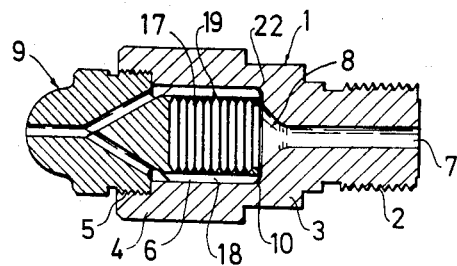

United States Patent [19]

Müller

[11] Patent Number: 4,474,333
[45] Date of Patent: Oct. 2, 1984

[54] INJECTION MOLD NOZZLE WITH FILTERING FUNCTION

[76] Inventor: Hans K. Müller, 502 57, Borås, Sweden

[21] Appl. No.: 400,348

[22] Filed: Jul. 21, 1982

[30] Foreign Application Priority Data

Jul. 23, 1981 [SE]  Sweden .............................. 8104510
Mar. 23, 1982 [SE]  Sweden .............................. 8201830

[51] Int. Cl.³ .............................................. B05B 1/14
[52] U.S. Cl. ..................................... 239/590; 239/462
[58] Field of Search ................. 239/590, 590.3, 590.5, 239/600, 462, 587, 575; 210/247, 260, 261, 446, 448, 449

[56] References Cited

U.S. PATENT DOCUMENTS

| 541,168 | 6/1895 | Keefe | 239/428 |
| 559,440 | 5/1896 | Conrader | 210/448 X |
| 1,635,635 | 4/1923 | Willners | 239/590.3 X |
| 2,681,829 | 6/1959 | Wahlin | 239/590.3 |
| 3,143,163 | 6/1960 | Renner | 239/540.3 X |

FOREIGN PATENT DOCUMENTS 1121320  1/1962  Fed. Rep. of Germany .

OTHER PUBLICATIONS

German Publication No. 2,808,951, Date: 9/21/1978.
German Publication No. 2,904,158, Date: 8/7/1980.

Primary Examiner—John J. Love
Assistant Examiner—Kevin Patrick Weldon
Attorney, Agent, or Firm—Finnegan, Henderson, Farabow, Garrett & Dunner

[57] ABSTRACT

A filtering nozzle for injection molding purposes comprises two parts (1,9), one of which having a bore (6) and the other one a tubular portion (10) fitting within said bore. The tubular portion has internal, annular and axially spaced grooves and has in its outer, envelope surface a number of substantially axial grooves (18) each having such a depth that it penetrates the wall of the tubular portion at the zones of the tops of the internal grooves thus generating a multitude of openings (19) in said tubular portion. By means of channels (7,8,20,21) the plastic melt is directed through the nozzle such that it passes through said openings (19) of the tubular portion. The nozzle parts are screwed into each other, making assembly and dismantling easy.

6 Claims, 4 Drawing Figures

INJECTION MOLD NOZZLE WITH FILTERING FUNCTION

This invention refers to a nozzle for injection molding.

In injection molding of plastic material it is of importance that the melted plastic material does not contain foreign particles such as metal fragments or the like since such partilces can cause severe damage to the expensive molds.

It is also important that the melted plastic material is completely plasticized when it enters the mold since the quality of the molded parts is otherwise influenced in a negative way.

The object of the invention is thus primarily to provide a filtering nozzle for injection molding which separates foreign particles from the melt before it leaves the nozzle and also brings forth a plastification in the nozzle itself.

Another object of the invention is to provide a simple, sturdy and inexpensive nozzle of the kind referred to, which additionally can be easily dismantled for cleaning purposes.

To achieve these and other objects the invention has the characteristics according to the claims.

Figure 2:
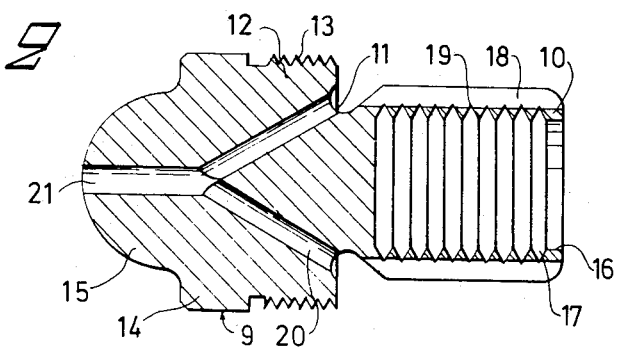
Figure 3:
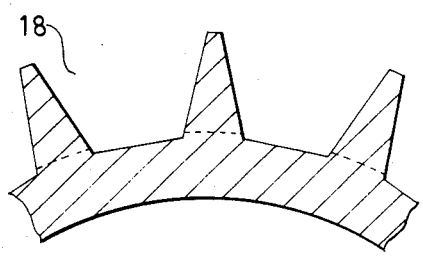
Figure 4:
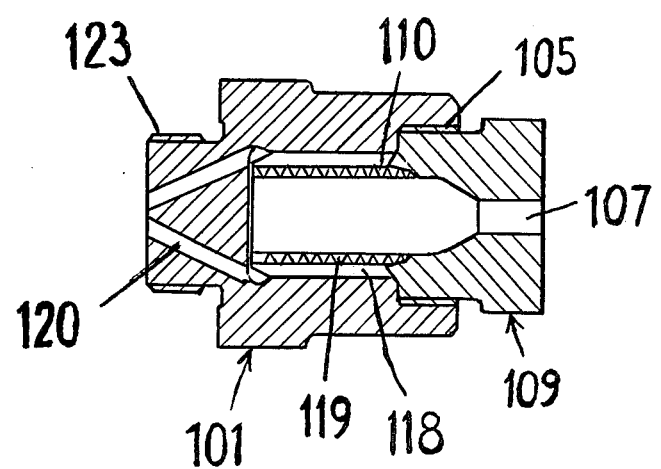

In the accompanying drawing two preferred embodiments of the invention are illustrated and FIG. 1 is a longitudinal section through a first embodiment of the nozzle FIG. 2 is a longitudinal section on a bigger scale through one of the parts of the nozzle according to FIG. 1, FIG. 3 is a partial transverse section, on a bigger scale, through the right hand part of the nozzle part of FIG. 2, FIG. 4 is a longitudinal section through a second embodiment of the invention.

The nozzle according to FIGS. 1-3 comprises a first nozzle part, generally designated as 1. This nozzle part has a threaded portion 2 by means of which the nozzle part in question is secured to the cylinder of an injection molding machine, a flange portion 3 to limit the screwing of said nozzle part into said cylinder and a body portion 4 which preferably has planar surfaces or other kinds of grips for a wrench or the like. The nozzle part 1 further has a relatively short, threaded bore 5, a somewhat narrower bore 6 communicating therewith and a still narrower through bore 7 which is in communication with the bore 6 by means of a conical portion 8.

The nozzle further comprises a second nozzle part, generally designated as 9. Said nozzle part 9 has a tubular portion 10, which has substantially the same outer diameter as the bore 6 and a length somewhat smaller than the depth of the bore 6. The tubular portion 10 continues via a rounded portion 11 in a portion 12, which has external threads 13 for cooperation with the thread of the bore 5. The nozzle part 9 preferably has a portion 14 with planar surfaces serving as a grip for a wrench or the like for screwing the nozzle part 9 into nozzle part 1. The nozzle part 9 is in the free end thereof-which in FIG. 1 is to the left-shaped so as to sealingly cooperate with a nozzle of the injection mold and in the illustrated example the shape is semispherical 15.

Known in the art are also mold nozzles having a planar end portion and in such cases the machine nozzle has of course a planar end surface instead of the semispherical portion 15.

The nozzle part 9 has a bore 16, extending from the right hand end thereof and said bore can either be threaded or as shown grooved by a plurality of axially spaced annular grooves 17, preferably of triangular section. In the tubular portion 10 are externally a plurality of axially extending grooves 18 having such a depth that they break through the tops of the triangular grooves 17. Thus a multitude of narrow opening 19 are formed in the portion 10.

A number of inclined holes 20, extending from the rounded portion 11 communicate with a central outlet 21.

The new filtering nozzle now described comprises only two parts, which are screwed into each other according to FIG. 1 and it is thus obvious that the main part of the plastic melt, which from the cylinder reaches the nozzle channel 7 via the conical passage 8 enters the chamber which consists of the bore 6. From this one the melt passes through the minor openings 19 into the grooves 18, from which they, via the inclined holes 20, reach the outlet opening 21. A minor part of the melt can pass the space 22 which is generated intermediate the end surface of the portion 10 and the bottom of the bore 6. This is of importance to prevent material from burning.

It is obvious that particles having a dimension exceeding the openings 19 cannot pass through these openings 19 and will consequently not be allowed to pass out of the outlet opening 21 together with the plastic melt. It is also obvious that plastification of not completely plasticized material to a certain degree takes place within the chamber 6 by mixing with completely plasticized material and by the friction heat which takes place during the passage through the openings 19.

It is also clear that assembly and disassembly is very simple. To clean the nozzle it is only necessary to unscrew the part 9 while the part 1 can remain secured to the machine. The nozzle parts are also relatively simple and inexpensive and the filter will have a sturdy construction thanks to the conical groove profile.

The nozzle shown in FIG. 4 differs from the nozzle just described in that it is intended to be used as a nozzle for a mold preferably of the hot-runner type. This nozzle is constructed in principially the same manner as the nozzle just described but the nozzle part 101 has an internally threaded portion 105 cooperating with an external threaded portion of the other nozzle part 109, which has a central inlet opening 107 and a tubular portion 110, fitting within a bore 118 of the nozzle part 101. The tubular portion is designed in substantially the same way as the tubular member 10 described before such that a multitude of minor openings 119 are generated to form a communication between the interior of the tubular member 110 and the outer portion of the bore 118 surrounding said tubular member. Also in this case the depth of the bore 118 is such that an annular space is generated between the end of the tubular member 110 and the bottom of the bore 118 for the same purpose as described in connection with the first embodiment.

The nozzle part 101 has a threaded portion 123 intended to cooperate with a corresponding internally threaded portion of one of the blocks of the mold and a number of inclined openings 120 extend from the outer portion of bore 118 and substantially meet in the left hand end surface of the mold part 101. Said block is designed so as to distribute the plastic melt to the various cavities of the mold and said block is preferably heated to keep the plastic material in the distribution channels in its plasticized condition.

It is obvious that the nozzle can also be designed in such a manner that the plastic melt passes through the openings 19, 119 in the opposite direction as now described, i.e. in a radial inwards direction instead of the radial outwards direction described.

The rounded portion 11 of FIG. 1 consists of an annular groove with rounded section and having a diameter less than the outer diameter of the tubular portion 10 thus forming an annular chamber for distributing the plastic melt to the inclined holes. Also in the embodiment according to FIG. 4 such a distribution chamber is provided in that the bottom of the bore for the tubular portion is limited by a groove having an outer diameter exceeding that of the bore itself.

It is obvious that the grooves 18 need not be straight but can be for instance helical.

What I claim is:

1. A nozzle for injection molding comprising:
   first and second nozzle parts interconnected by cooperating portions;
   a relatively wide bore in said first nozzle part;
   a tubular portion of said second nozzle part extending into said relatively wide bore, said tubular portion having substantially the same outer diameter as the diameter of said bore, the curved envelope surface of said tubular portion containing a plurality of substantially axially extending grooves providing a multitude of minor openings between said tubular portion and said bore, said openings being of substantially rectangular cross section, and wherein said tubular portion also contains a plurality of annular, axially spaced grooves across the bottoms of said axially extending grooves; and
   channel means for directing plastic melt through said nozzle via said minor openings and across said axially spaced grooves.

2. The nozzle of claim 1 wherein said axially spaced grooves are triangular in cross section.

3. A nozzle as claimed in claim 1, wherein said tubular portion includes an axial extension beyond said axially spaced grooves, and said bore and said axial extension are dimensioned to form a minor annular space between the inner end of said bore and the free end of said tubular portion.

4. A nozzle as claimed in claim 1 wherein said first nozzle part has a central opening communicating with said bore and wherein the channel means includes a plurality of inclined channels in communication with the outlet of said nozzle.

5. A nozzle as claimed in claim 4, wherein the inner end of the relatively wide bore is limited by a rounded annular groove having an outer diameter exceeding that of the bore itself and wherein said inclined channels extend from said groove to form the outlet of the nozzle.

6. A nozzle as claimed in claim 4, also including a rounded annular groove in said second nozzle part having a diameter inferior to the diameter of the tubular portion forming a transition between the tubular portion and the second nozzle part and wherein said inclined channels extend from said annular groove to form the outlet of the nozzle.

* * * * *